Patented July 29, 1924.

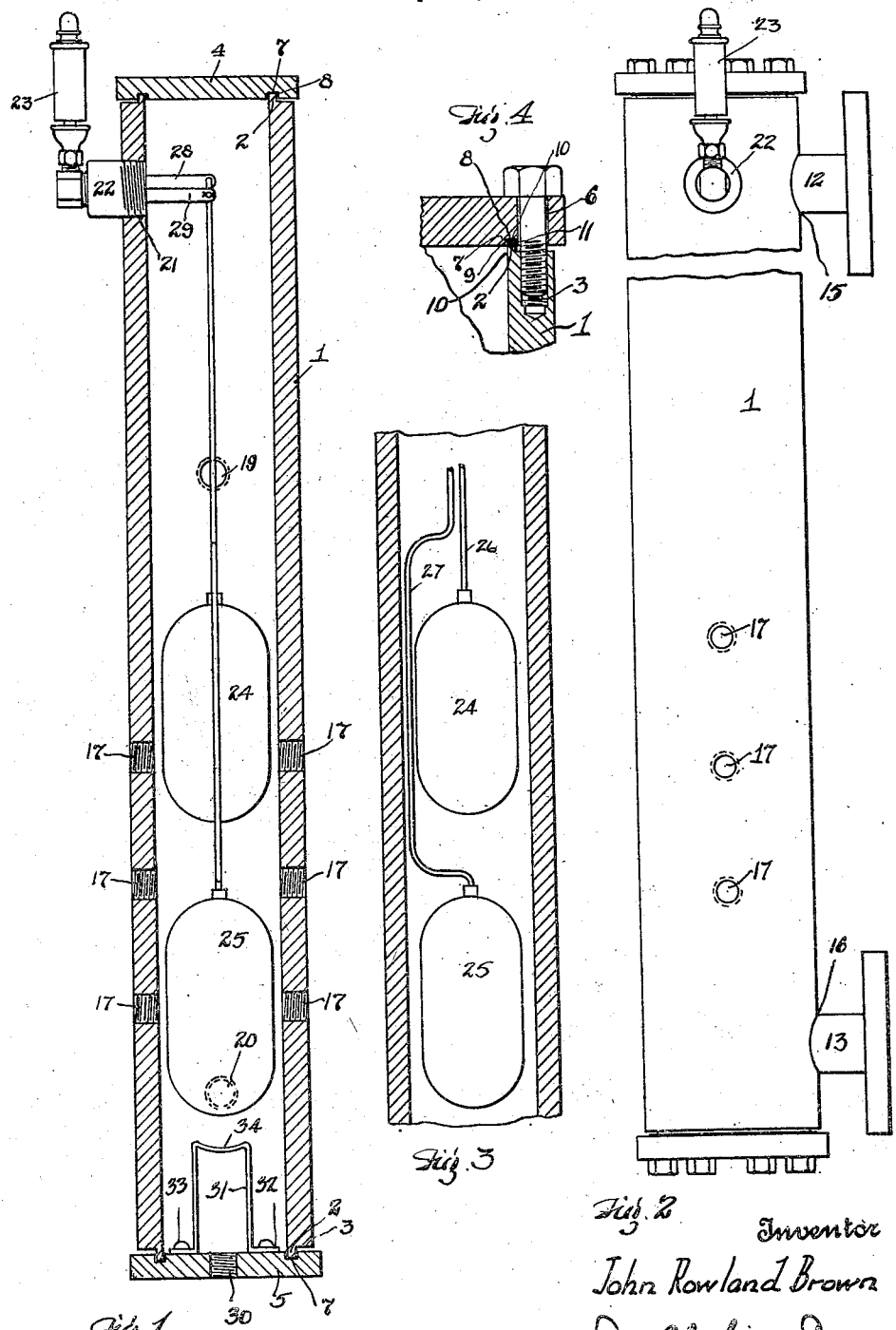

1,502,808

UNITED STATES PATENT OFFICE.

JOHN ROWLAND BROWN, OF CLEVELAND, OHIO, ASSIGNOR TO THE RELIANCE GAUGE COLUMN COMPANY, OF CLEVELAND, OHIO, A CORPORATION OF OHIO.

WATER COLUMN.

Application filed September 25, 1920. Serial No. 412,787.

*To all whom it may concern:*

Be it known that I, JOHN ROWLAND BROWN, a citizen of the United States, and a resident of Cleveland, county of Cuyahoga, and State of Ohio, have invented a new and useful Improvement in Water Columns, of which the following is a specification, the principle of the invention being herein explained and the best mode in which I have contemplated applying that principle, so as to distinguish it from other inventions.

The object of my invention is to provide an improved water column for use with high pressures, and which will be of such design as to be easily constructed and safe and reliable in operation, and free of the usual flanges or bosses connecting the several parts of the structure. To this end I use for my apparatus a tenacious metal and form the body portion of wrought steel pipe and the ends of the column of heavy steel plates, thus making the column capable of withstanding high pressures ranging from three hundred and fifty pounds per square inch upwardly. This, in turn, necessitates special constructional features, such as a lipped edge at the inner circumference of the pipe section with corresponding grooved end plates to coact therewith and an interposed gasket to make the joint secure. A special stop is provided to prevent the lower float from dropping into contact with the fluid connection at the base of the column in blowing off to clear from sediment and permit liquid to be drawn around and below the float near its working position to insure the cleaning out of all sediment which might interfere with the proper functioning of the internal parts of the apparatus. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a sectional elevation of my apparatus; Fig. 2 is a side elevation of the same as seen from the left of the view shown in Fig. 1; Fig. 3 is a sectional detail view of a portion of the column showing the arrangement of the connecting rods of the floats; Fig. 4 is a sectional detail view illustrating the method of connecting the body section of the column with the end plates thereof.

Referring to the drawings, a pipe section 1 of appropriate length is provided at each of its ends with a lip or extension edge 2 at the inner circumference thereof. A plurality of holes 3 are then drilled and tapped into each of the ends of said pipe section between the inner lipped portion and the outer edge, and flat cover plates 4 and 5, preferably of tenacious metal such as forged steel, of slightly larger diameter than the outside diameter of the pipe section, are connected to the respective ends of the pipe section through plurality of bolt holes 6 placed so as to register with the tapped holes in the pipe ends. Previous to securing such plates to the pipe section, the abutting portions thereof are each provided with grooves or channel-ways 7 of a size to closely fit the lips on the ends of the pipe section which they are designed to receive. The depth of the grooves, however, is slightly larger than the height of the corresponding lipped portions and thus allows for the insertion of a gasket 8 within said grooves to make a fluid tight joint at that point capable of withstanding very high pressures. The construction of the lips or extensions on the ends of the pipe section, as is shown in Fig. 4 of the drawing particularly, provides for a square or flat end surface 9 for such extensions, and an inner side 10 of the extension flush with the inner surface of the column of which it is an integral continuation. The outer wall 11 of this extension is parallel with the inner surface, the extension thus presenting a rectangular cross section.

Suitable inlet and outlet passage-ways 12 and 13 are provided by suitable connections 14 through tapped apertures 15 and 16 drilled into the side of the column near the top and bottom thereof at any convenient radial positions and a plurality of tapped apertures 17 are drilled into the sides of the column preferably, as shown in Figure 3 on opposite sides, the lower pair of apertures being slightly below the mid-length of the lower half of the column and the upper pair of apertures slightly below the mid-length of the entire column, the intermediate pair of apertures being placed midway between the other two pairs. Into these apertures are screwed gauge cocks of any preferred design. Tapped apertures 19 and 20 of slightly larger diameter are provided on one side of the pipe preferably in a position circumferentially midway between the gauge cock apertures referred to, the lower one being placed longitudinally of the column somewhat below the lowest pair of gauge cock apertures and the upper one near the midlength of the upper half of the column. A water gauge of any preferred design is applied to the column through the medium of proper connections screwed into the last described apertures.

Near the top of the column, as shown in Figs. 1 and 2, a tapped aperture 21 is provided for the attachment of a valve body 22 having preferably high and low alarm valves and a signalling or indicating device, the drawing showing a whistle 23. The high and low alarm valves are controlled by two floats 24 and 25 with their respective supporting rods 26 and 27 and operating levers 28 and 29. The floats fill the greater portion of the inside diameter of the column and the supporting rod of the lower float is bent so as to occupy the space between the upper float and the inner wall of the column without interfering with the operation of the upper float, as will be understood. The base plate of the column is provided centrally with a tapped aperture 30 for a blow-off or drainage connection, and may ordinarily be closed by a plug. Bridged over this aperture is a float stop 31 preferably made, as shown in Fig. 1, of a metal strap of inverted U-shape and having outwardly bent extensions or feet 32 which are secured to the base plate by appropriate fastening means shown in the drawing as screw fastenings 33. The upper section 34 of the U-shaped strap is preferably given a shape corresponding to the rounded contour of the end of the lower float which it is intended to support and keep free of the fluid connection at the base of the column. Obviously, the form of this protective support may be varied to correspond with the size and weight of the floats employed and the usual requirements as to simplicity of manufacture.

The use of the float stop is particularly desirable where steam at high pressure is dealt with as the operating parts within the column are thus kept free of obstruction and become in a measure self-cleansing. Blowing off and flushing operations to clear of sediment are also greatly facilitated, as the floats are held close to their normal working positions and any obstructive matter adhering to the walls will be dislodged as the fluid is forced through the constricted passage-ways.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:—

1. A water column adapted to withstand high pressure, comprising a wholly straight cylindrical body portion of tenacious metal, an extension edge at the inner circumference of each of the ends of said body portion, circular end plates of tenacious metal, of substantially the diameter of the body, secured to said body portion, and grooves in said plates to receive said extension edges.

2. A water column adapted to withstand high pressure comprising a cylindrical body portion of tenacious metal, an extension edge at the inner circumference of each of the ends of said body portion, circular end plates of tenacious metal secured to said body portion, grooves in said plates of slightly greater depth than the height of the extension edges they are adapted to receive, and gaskets interposed between said extension edges and said grooves.

3. A water column adapted to withstand high pressures, and comprising a body portion of a forged steel pipe section, an extension edge at the inner circumference of each end of said section, the main portion of the respective pipe ends being provided with threaded bolt holes, and steel plate end sections provided with grooves to receive said extension edges and having their marginal portions provided with bolt holes adapted to register with the bolt holes of said pipe section and bolts to secure the respective end plates to said pipe section.

Signed by me this 23rd day of September, 1920.

JOHN ROWLAND BROWN.